(12) United States Patent
Dautartas (10) Patent No.: US 7,158,701 B2
(45) Date of Patent: Jan. 2, 2007

(54) METHOD FOR MAKING OPTICAL DEVICES WITH A MOVING MASK AND OPTICAL DEVICES MADE THEREBY

(75) Inventor: Mindaugas F. Dautartas, Blacksburg, VA (US)

(73) Assignee: Shipley Company, L.L.C., Marlborough, MA (US)

( * ) Notice: Subject to any disclaimer, the term of this patent is extended or adjusted under 35 U.S.C. 154(b) by 0 days.

(21) Appl. No.: 10/081,995

(22) Filed: Feb. 21, 2002

(65) Prior Publication Data

US 2003/0002793 A1    Jan. 2, 2003

Related U.S. Application Data

(60) Provisional application No. 60/270,468, filed on Feb. 21, 2001.

(51) Int. Cl.
*G02B 6/34*    (2006.01)

(52) U.S. Cl. ................................. 385/37; 385/129

(58) Field of Classification Search ............... 385/14, 385/28, 37, 43, 49, 50, 129–132; 65/386, 65/403
See application file for complete search history.

(56) References Cited

U.S. PATENT DOCUMENTS

| | | | |
|---|---|---|---|
| 3,984,173 A | 10/1976 | Shaw | |
| 4,066,482 A | 1/1978 | Shaw | |
| 4,097,118 A | 6/1978 | Hammer | |
| 4,296,143 A | 10/1981 | Franken et al. | |
| 4,370,021 A | 1/1983 | Khoe et al. | |
| 4,384,038 A | 5/1983 | Khoe et al. | |
| 4,415,227 A | 11/1983 | Unger | 385/43 |
| 4,426,440 A | 1/1984 | Thompson | |
| 4,524,127 A | 6/1985 | Kane | |
| 4,585,299 A | 4/1986 | Strain | |
| 4,678,267 A | 7/1987 | Burns et al. | |
| 4,688,884 A | 8/1987 | Scifres et al. | |
| 4,773,720 A | 9/1988 | Hammer | |
| 4,789,642 A | 12/1988 | Lorenzo et al. | |
| 4,886,538 A | 12/1989 | Mahapatra | |
| 4,927,781 A | 5/1990 | Miller | |
| 4,931,077 A | 6/1990 | Angenent et al. | |
| 4,991,926 A | 2/1991 | Pavlath | |
| 5,009,475 A | 4/1991 | Knudson | |
| 5,018,809 A | 5/1991 | Shin et al. | |
| 5,057,022 A | 10/1991 | Miller | |
| 5,071,216 A | 12/1991 | Sullivan | |

(Continued)

FOREIGN PATENT DOCUMENTS

EP    0687925    12/1995

(Continued)

OTHER PUBLICATIONS

I. F. Lealman, et al. "Tapered Active Layer Laser Device Performance and its Impact on Low Cost Optoelectronics", 4:00-4:30pm (Invited) EMGW2.2, pp. 11 and 12.

(Continued)

*Primary Examiner*—Kevin S. Wood
(74) *Attorney, Agent, or Firm*—Jonathan D. Baskin (57) ABSTRACT

The present invention provides a method for forming a vertical taper in a waveguide. In the present invention, a shadow mask is disposed above a waveguide requiring a vertical taper. Then, the waveguide is exposed to a directional etching process (e.g. deep reactive ion etching) while the mask is moved. Ask the mask moves, different regions of the waveguide will be etched different depths, resulting in a vertical taper in the waveguide.

20 Claims, 8 Drawing Sheets

U.S. PATENT DOCUMENTS

| | | | |
|---|---|---|---|
| 5,078,516 A | 1/1992 | Kapon et al. ............... 385/129 |
| 5,135,590 A | 8/1992 | Basavanhally et al. |
| 5,142,596 A | 8/1992 | Mizuuchi et al. |
| 5,172,143 A | 12/1992 | Baude et al. ............... 351/177 |
| 5,208,882 A * | 5/1993 | Strasser et al. ............... 385/37 |
| 5,265,177 A | 11/1993 | Cho et al. .................... 385/14 |
| 5,278,926 A | 1/1994 | Doussiere ................... 385/28 |
| 5,281,305 A | 1/1994 | Lee et al. |
| 5,351,323 A | 9/1994 | Miller et al. |
| 5,354,709 A | 10/1994 | Lorenzo et al. |
| 5,439,782 A | 8/1995 | Haemmerle et al. ........ 430/321 |
| 5,444,805 A | 8/1995 | Mayer |
| 5,456,797 A | 10/1995 | Weber et al. |
| 5,465,860 A | 11/1995 | Fujimoto et al. |
| 5,540,346 A | 7/1996 | Fujimoto et al. |
| 5,576,149 A | 11/1996 | Yamamoto et al. ........... 385/43 |
| 5,629,999 A | 5/1997 | Henry et al. .................. 385/43 |
| 5,671,316 A | 9/1997 | Yuhara et al. |
| 5,672,538 A | 9/1997 | Liaw et al. |
| 5,703,895 A | 12/1997 | Ghirardi et al. |
| 5,844,929 A | 12/1998 | Lealman et al. ............... 372/45 |
| 5,854,868 A | 12/1998 | Yoshimura et al. ........... 385/50 |
| 5,868,952 A | 2/1999 | Hatakeyama et al. ......... 216/66 |
| 5,940,557 A | 8/1999 | Harker |
| 5,953,477 A | 9/1999 | Wach et al. |
| 5,966,617 A | 10/1999 | Ismail |
| 5,999,295 A | 12/1999 | Vowell et al. |
| 6,003,222 A | 12/1999 | Barbarossa |
| 6,015,976 A * | 1/2000 | Hatakeyama et al. .. 250/492.23 |
| 6,108,478 A | 8/2000 | Harpin et al. ............... 385/129 |
| 6,197,656 B1 | 3/2001 | Adkisson et al. |
| 6,229,947 B1 | 5/2001 | Vawter et al. |
| 6,292,609 B1 * | 9/2001 | Matsushima et al. ......... 385/43 |
| 6,317,445 B1 | 11/2001 | Coleman et al. |
| 6,396,984 B1 | 5/2002 | Cho et al. |
| 6,459,840 B1 * | 10/2002 | Sato et al. ................... 385/129 |
| 2003/0068149 A1 | 4/2003 | Dautartas et al. |
| 2003/0118310 A1 | 6/2003 | Steinberg et al. |

FOREIGN PATENT DOCUMENTS

| | | | |
|---|---|---|---|
| JP | 06-338653 | * | 6/1994 |
| WO | WO 97/42534 | | 11/1997 |
| WO | WO 02/095453 | | 11/2002 |
| WO | WO 03/050580 | | 6/2003 |

OTHER PUBLICATIONS

Y. Shani, et al. "Efficient coupling of a semiconductor laser to an optical fiber by means of a tapered waveguide on silicon", Appl. Phys. Lett. 55 (23) Dec. 4, 1989, pp. 2389-2391.

Spuhler, et al. "Very Short Planar Silica Spot-Size Converter." Journal of Lightwave Technology, vol. 16, No. 9, pp. 1681-1685, Sep. 1998.

* cited by examiner

METHOD FOR MAKING OPTICAL DEVICES WITH A MOVING MASK AND OPTICAL DEVICES MADE THEREBY

RELATED APPLICATIONS

The present application claims the benefit of priority of copending provisional patent application No. 60/270,468 filed on Feb. 21, 2001, which is hereby incorporated by reference as if set forth in full.

FIELD OF THE INVENTION

The present invention relates generally to micromachining. More particularly, the present invention relates to a new method for making vertically tapered waveguides and diffraction gratings.

BACKGROUND OF THE INVENTION

Waveguide tapers are important for coupling between waveguides having different mode sizes. Taper in the horizontal (width) direction is relatively simple to make using a mask with a horizontal taper pattern. Waveguides tapered in the vertical (thickness) direction are particularly difficult to make, but are important for minimizing coupling loss when coupling waveguides. For example, a vertical taper is important for coupling an optical fiber to a silicon waveguide.

SUMMARY OF THE INVENTION

The present invention includes a method for manufacturing an optical device comprising moving a mask situated between a layer of optical waveguide material to be shaped and a source of etchant ions, wherein the motion exposes at least two areas of the substrate to variable amounts of etchant ions, thereby causing vertical thickness variations between the at least two areas, and an optical device comprising a waveguide and a Bragg diffraction filter, wherein the waveguide and the Bragg diffraction filter are made from the same monolithic optical material.

Monolithic here is defined as using the same layer or layers of optical materials initially deposited on a substrate as a starting point to fabricate multiple optically connected devices, as opposed to an optical material of constant composition.

DESCRIPTION OF THE FIGURES

FIGS. 1(*a*) and 1(*b*) show a top and side view of a prior art horizontally tapered waveguide on a substrate.

FIGS. 2(*a*)–2(*d*) show a movable mask over the waveguide of FIGS. 1(*a*) and 1(*b*). Moving the mask sideways provides variable exposure to etchant ions, resulting in a vertically tapered waveguide, for one embodiment of the invention.

FIGS. 3(*a*) and 3(*b*) show a ribbed vertically tapered waveguide, for another embodiment of the invention.

FIGS. 4(*a*)–(*c*) show a side view and cross-sections of a ribbed waveguide.

FIG. 4(*d*) shows a cross section of a waveguide having multiple tapers.

FIG. 5(*a*) shows a comb movable mask, for yet another embodiment of the invention.

FIG. 5(*b*) shows a comb movable mask used in combination with a stationary mask.

FIGS. 6(*a*) and 6(*b*) show a movable mask with slits producing a diffraction grating, and FIGS. 6(*c*) and 6(*d*) show resulting waveguide structures having a diffraction grating.

FIGS. 7(*a*) and 7(*b*) show a reciprocating mask with tapered teeth, and a sidewall shape produced therewith.

FIGS. 8(*a*) and (*b*) show a comb movable mask and a shaped sidewall produced therewith.

DETAILED DESCRIPTION

The present invention provides a method for forming a vertical taper in a waveguide. In the present invention, a shadow mask is disposed above a waveguide requiring a vertical taper. Then, the waveguide is exposed to a directional etching process (e.g. deep reactive ion etching) while the mask is moved. As the mask moves, different regions of the waveguide will be etched different depths, resulting in a vertical taper in the waveguide.

The present invention provides a method for making integrated optical waveguides that are tapered horizontally and vertically. Horizontal tapering, in some embodiments, is provided by conventional masking and etching. A mask that is moved during the etching process provides the vertical tapering. The location vs. time function of the moving mask determines the vertical taper profile of the waveguide.

Figure 1A:
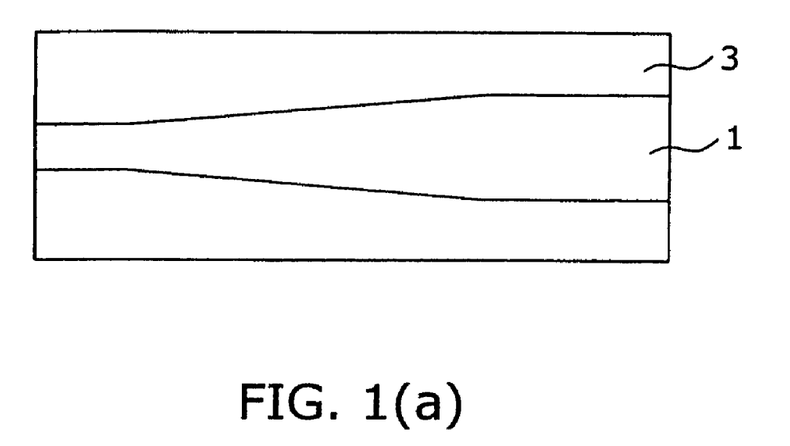
Figure 1B:
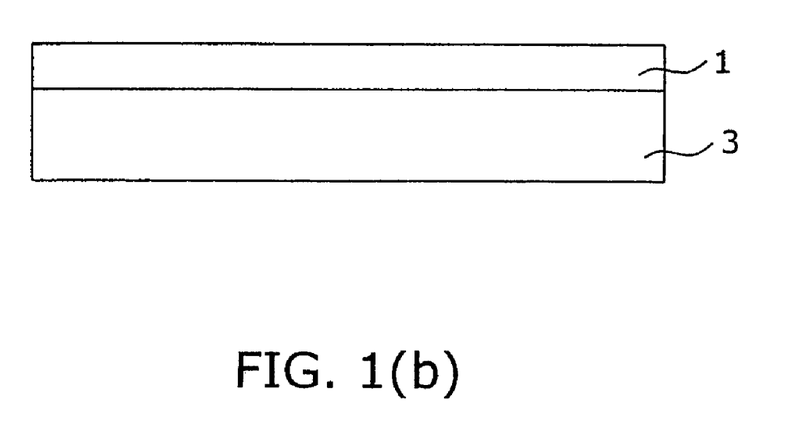
Figures 2A, 2D:
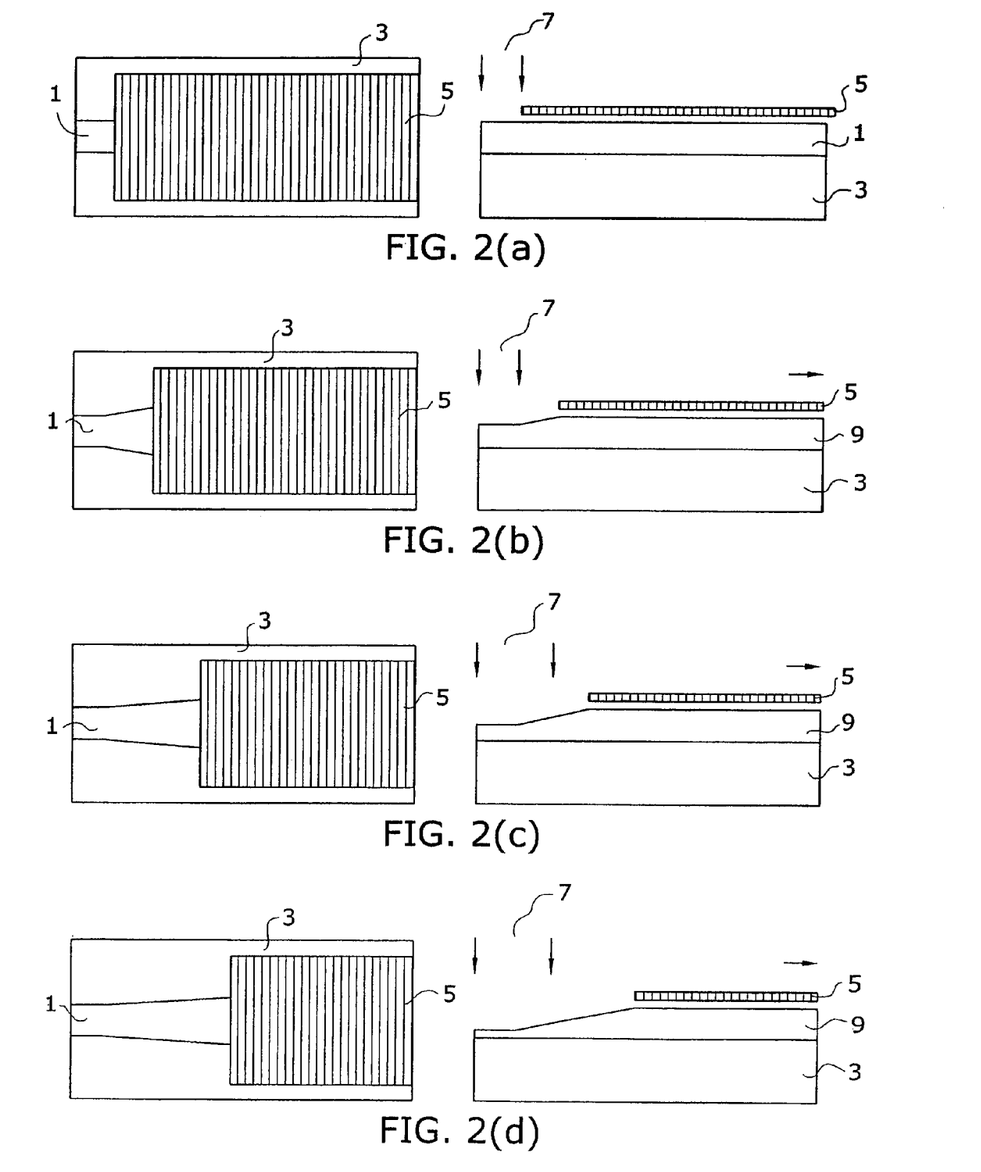

In a method of the present invention, a waveguide is formed on a substrate. The waveguide can be made of many materials including Si, GaAlAs, GaAs, InP, silicon oxynitride, doped glass or other materials. The present invention is applicable to any waveguide material that can be etched by ion beam milling, dry etching, or the like. The substrate materials include semiconductors such as silicon, ceramics and the like. The substrate may be clad. Optionally, the waveguide has a horizontal taper shape (i.e., the waveguide is tapered as viewed from above). The waveguide may be a rib waveguide. A starting point waveguide 1 over a substrate 3 may be seen in a top view in FIG. 1(*a*), and in a side view in FIG. 1(*b*). The horizontal tapering is achieved with conventional photolithography and etching.

The waveguide is etched, with, for example, reactive ions 7, through a mask 5 that is movable with respect to the substrate 3. The sequence of FIGS. 2(*a*)–2(*d*) illustrates the etching of the waveguide 1 during the etching process. It is noted that the length of the taper may be about 0.5–1 mm. If the substrate 3 is a circular wafer, then the motion of the mask 5 is in the plane of the substrate and in a radial direction. Wafers usually are provided with flats for keying, and the motion may also be described as linear, as opposed to rotational, with respect to the flat. As the mask 5 moves, areas of the waveguide 1 beyond the edge of the mask 5 are exposed to greater etch times than other areas, which produces a waveguide 9 with a vertical taper. In this embodiment, the mask 5 moves in a linear direction with respect to direction of the waveguide 9.

Figure 3A:
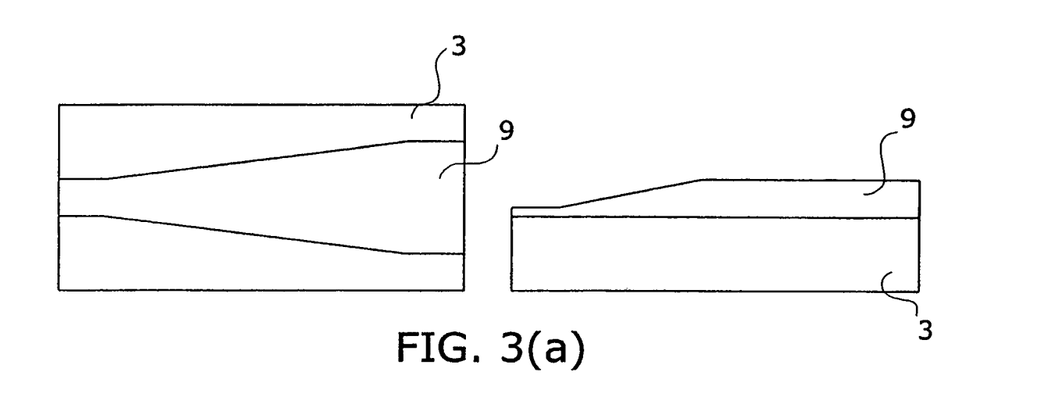

The mask 5 is removed. The resulting waveguide 9 has independently controllable horizontal and vertical taper profiles. The top view shows the horizontal tapering; the side view shows the vertical tapering, as can be seen in FIG. 3(*a*).

In the present invention, the horizontal taper profile may also be determined by the mask used to define the waveguide, rather than relying on conventional lithography. Therefore, the horizontal taper can have practically any shape desired. The vertical taper can also have practically any shape. In the above example, the mask has a single edge that is moved. In the case of using a movable mask with a single edge moving in a single direction, the vertical taper profile is monotonic, i.e., the taper profile may be monotonically tapered up, or monotonically tapered down. By moving the mask back and forth in the direction of the waveguide, non-monotonic profiles may be obtained. Since the horizontal and vertical taper profiles are independently controllable, they can have the same or different lengths. Note that the mask motion may have any mathematical function, including error function, triangular function, gaussian function, sinusoidal and the like. Note that gaussian functions and error functions, and other functions, may be used to provide an adiabatic taper.

Figure 3B:
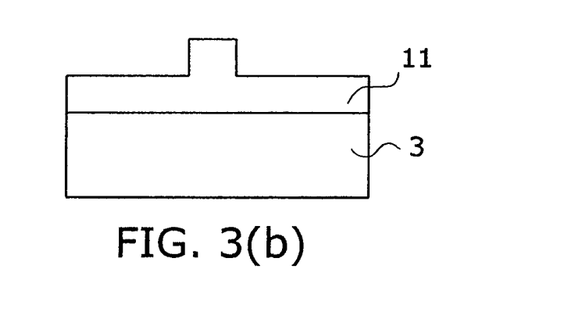
Figure 4A:
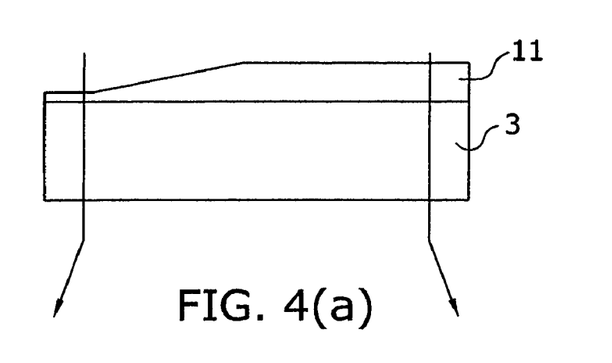
Figure 4B:
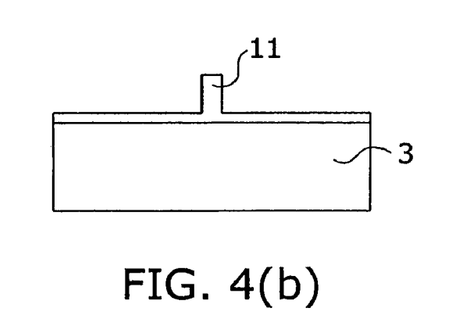
Figure 4C:
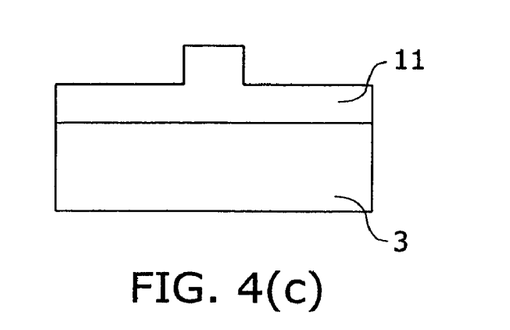

Rib-type waveguides made according to the present invention can be characterized by material removed from the waveguide rib as well as the areas surrounding the waveguide. Equal thicknesses of material can be removed from both the rib and the surrounding areas. FIG. 3(b) is a cross-sectional view of a rib waveguide 11. FIG. 4(a) is a side view of rib waveguide 11, while FIGS. 4(b) and 4(c) show cross sections of FIG. 4(a) at various locations.

Figure 4D:
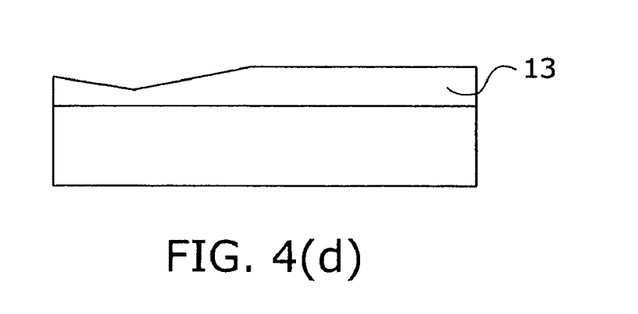

In the present invention, the moving-mask etching process can be applied multiple times so that the waveguide 13 has multiple taper shapes, as can be seen in FIG. 4(d).

The movable mask can be made of many materials, including silicon, metal plated silicon, metals, silica, ceramics and the like. Preferably, the mask has a very low etch rate in the plasma or ion beam used to etch the waveguide.

The mask can be moved by piezoelectric actuators or the like. In a preferred embodiment, the actuators are computer controlled to provide a precise time vs. position function. The time vs. position function of the movable mask determines the vertical taper profile.

Figure 5A:
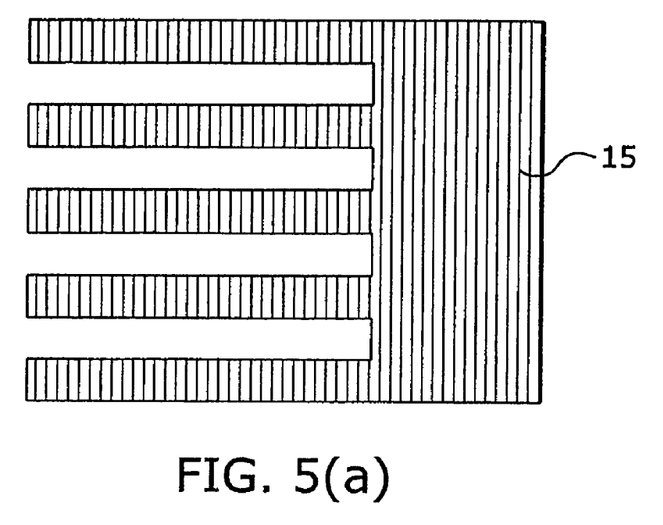

It is also noted in the present invention that the movable mask 15 can have comb-shaped areas, as shown in FIG. 5(a).

Figure 5B:
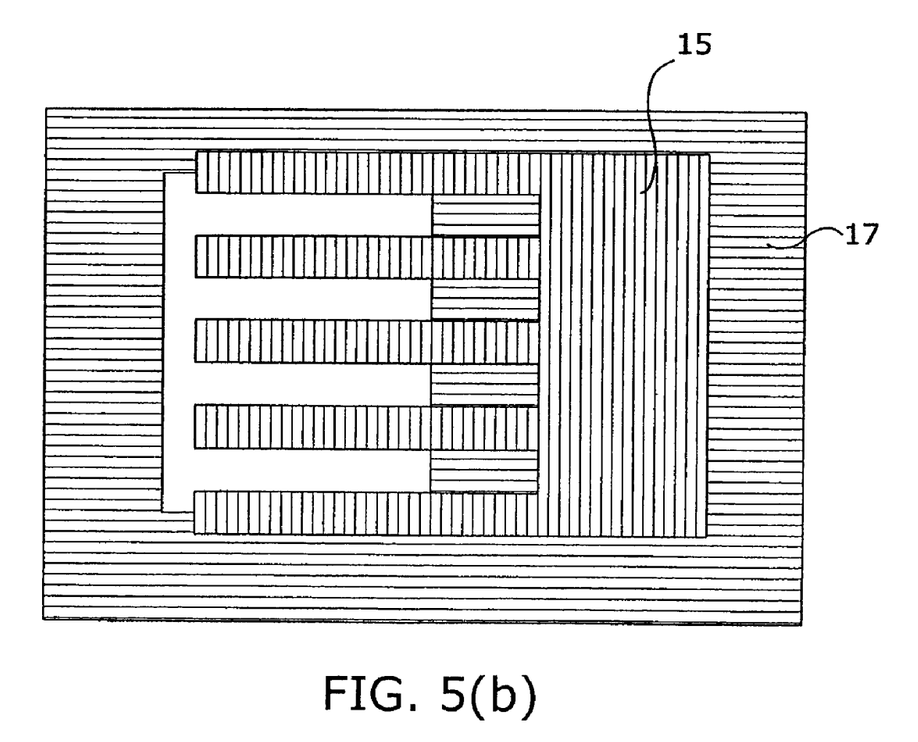

Also in the present invention, a stationary mask 17 can be combined with a moving mask 15, as seen in FIG. 5(b). A stationary mask 17 can provide mechanical support for the moving mask 15. Support for the moving mask 15 can be beneficial if the moving mask 15 has portions that are cantilevered or otherwise fragile.

Figure 6A:
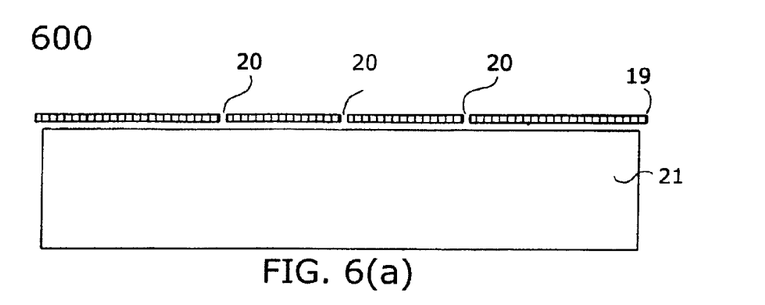
Figure 6B:
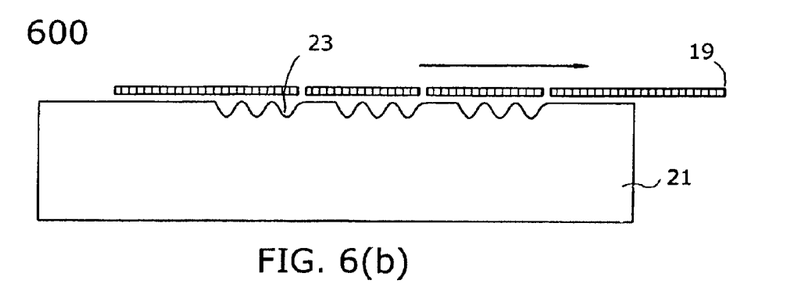
Figure 6C:
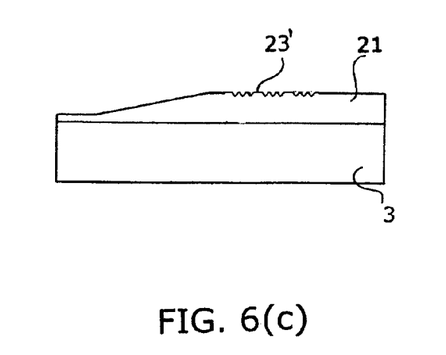

In another embodiment of the invention, the mask is moved with non-constant velocity so that a non-uniform etch pattern is established on the waveguide 21 surface, as can be seen in FIGS. 6(a) and 6(b). For example, if a mask 19 with slits or openings 20 is moved with an oscillatory velocity, then a corrugated surface 23 is formed. In this way, the present invention can be used to make diffraction gratings, such as Bragg filters, on the substrate surface. The mask 19 is moved during RIE or ion milling, for example. In this example, the mask 19 is moved with an approximately sinusoidal velocity. An advantage of the present invention is that by using, for example, a mask with an edge, and then a mask with slits, a single monolithic optical device can be made on a substrate comprising both a vertical tapered waveguide and a Bragg diffraction filter. This is done, for example, by first making a vertical tapered waveguide 21 on one end of a layer of an optical waveguide material on a substrate, masking the vertical tapered waveguide, and then making a diffraction grating 23' on the surface of the other end (which is not vertically tapered) of the waveguide as shown in FIG. 6(c). Thus, avoiding the dB coupling losses incurred by making such an optical device by coupling a discreet waveguide and a discreet filter. Hence, a waveguide capable of coupling to an optical fiber with a built in frequency filter is provided.

Figure 6D:
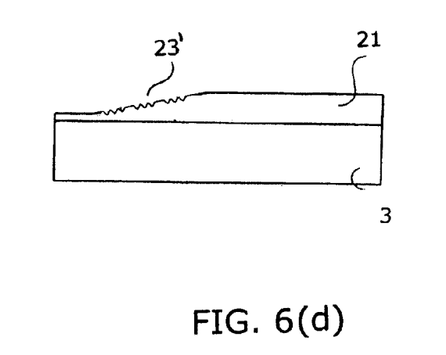

This is particularly useful in producing, for example, splitters for dense wave division multiplexers. Another embodiment is to make a vertically tapered waveguide, then provide a diffraction grating on the tapered surface, by using a mask with slits tilted to an angle that matched that of the vertical taper, so that the motion of the mask is out of plane with the substrate. A waveguide 21 resulting from such process is shown in FIG. 6(d).

Figure 7A:
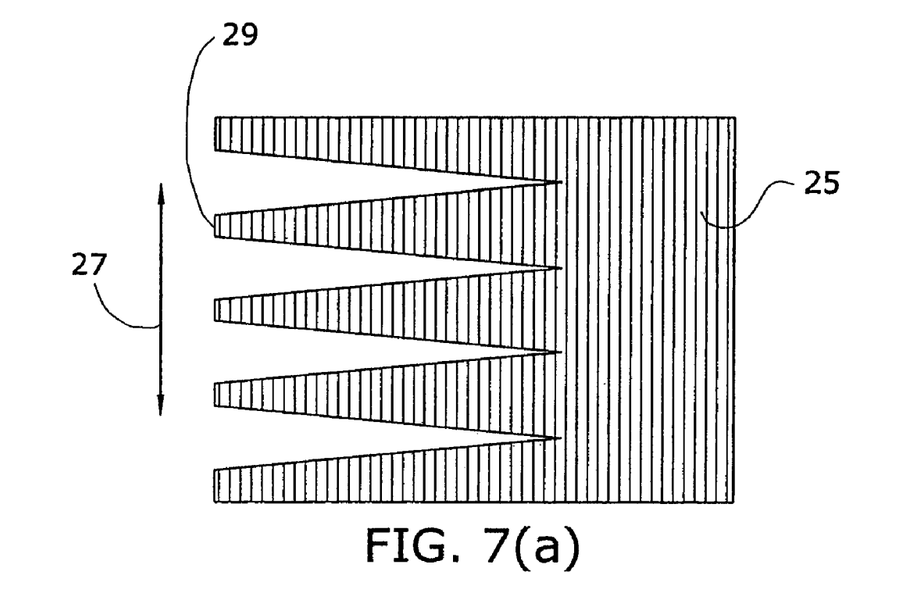
Figure 7B:
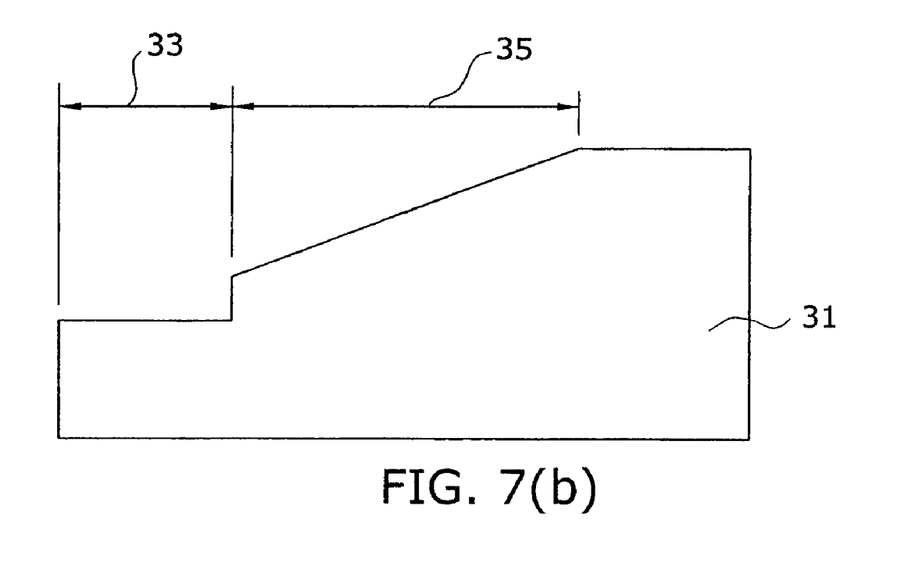

The present invention can also be used to make sloped features and sidewalls having specified sidewall profiles. Specific sloped sidewall shapes 31 can be made using a mask 25 with tapered comb teeth 29 combined with a reciprocating motion 27, as can be seen in FIGS. 7(a) and 7(b). In order to get a waveguide with smooth sidewall shape 31, the amplitude of the reciprocating motion 27 should be large compared to the size of the teeth. Also, the reciprocating motion should be perpendicular to the length of the teeth. The shape of the sidewall 31 is a function of the shape of the teeth 29. Note that in region 33, the substrate or waveguide is fully exposed to the etching ions, while in region 35, there is variable exposure. In this embodiment, the mask 25 reciprocates in a perpendicular direction with respect to direction of the waveguide having shaped, smooth sidewalls.

Figures 8A, 8B:
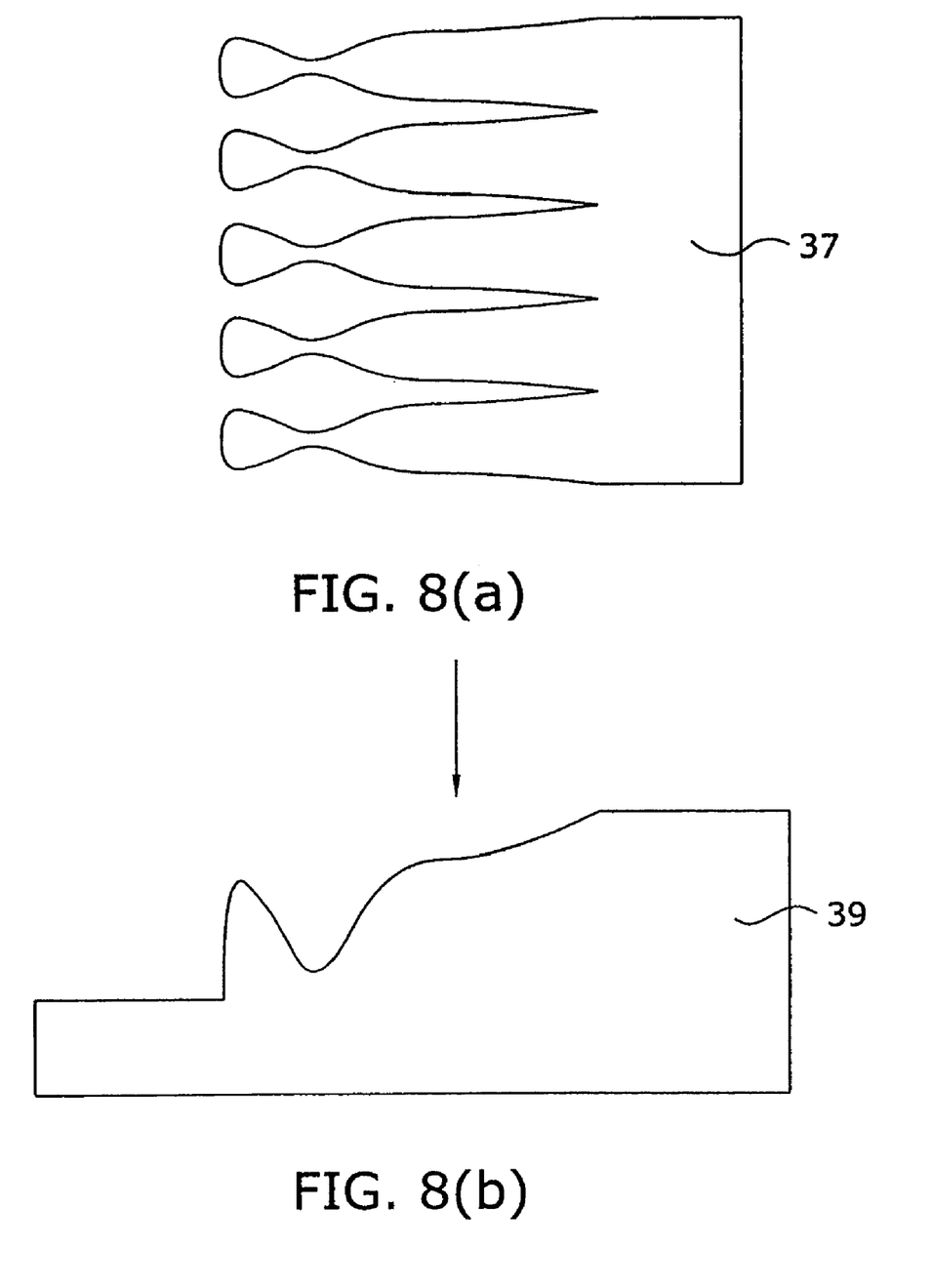

FIGS. 8(a) and 8(b) are another example of using a reciprocating mask 37 with teeth to make a sidewall 39 having a desired sidewall shape. The sidewall shape is essentially a reproduction of the tooth shape.

The reciprocating mask technique can also be used to make lenses such as cylindrical lenses.

It will be clear to one skilled in the art that the above embodiment may be altered in many ways without departing from the scope of the invention. Accordingly, the scope of the invention should be determined by the following claims and their legal equivalents.

What is claimed is:

1. A method for manufacturing an optical device comprising:
    moving a mask situated between a layer of optical waveguide material to be shaped and a source of etchant ions, wherein at least two areas of the optical waveguide material are exposed to variable amounts of etchant ions provided along a selected etching direction to provide a rib optical waveguide having an optical axis non-parallel to the selected etching direction and having a thickness that varies along the direction of the optical axis.

2. The method of claim 1, wherein the mask has a comb shape comprising teeth.

3. The method of claim 1, wherein the mask has a comb shape and wherein the mask comprises tapered teeth.

4. The method of claim 1, wherein the mask comprises at least one slit.

5. The method of claim 1, further comprising a stationary mask.

6. A vertically tapered waveguide produced by the method of claim 1.

7. A diffraction grating produced by the method of claim 1.

8. The method of claim 1, wherein the mask moves in a linear direction with respect to the plane of the optical waveguide direction.

9. The method of claim 1, wherein the mask moves with a reciprocating motion with respect to the plane of the optical waveguide direction.

10. A method of micromachining comprising:
etching through a moving mask so that a desired sidewall shape is produced in an optical material, wherein the moving mask is a comb mask comprising tapered teeth and the motion is a reciprocating motion along a direction perpendicular to the direction along which the teeth extend.

11. An optical device comprising:
a waveguide comprising an upper surface and a lower surface, the upper surface comprising a vertically tapered portion and a non-vertically tapered portion, wherein the waveguide is made of a material chosen from Si, GaAlAs, GaAs, silicon oxynitride and a doped glass; and
a diffraction grating disposed on the upper surface at the non-vertically tapered portion, wherein the waveguide and the diffraction grating are made from a monolithic optical material, and wherein the monolithic optical material is over a substrate common to both the waveguide and the diffraction grating, the substrate disposed adjacent to the lower surface of the waveguide.

12. A method for forming a waveguide with a vertical taper, comprising the steps of:
a) forming a rib waveguide;
b) disposing a movable mask above the waveguide;
c) moving the mask along the waveguide while exposing the waveguide to an ion etching process, so that a vertical taper is formed in the waveguide.

13. The method of claim 12 wherein the waveguide comprises silicon.

14. The method of claim 12 wherein the etching process is selected from the group consisting of deep reactive ion etching, plasma etching, ion beam milling, and laser-chemical etching.

15. The method of claim 12 wherein the mask is in contact with the waveguide.

16. The method of claim 12 wherein the mask is up to 250 microns above the waveguide.

17. The method of claim 12 wherein the mask is moved a distance of 50–1000 microns.

18. The method of claim 12 wherein the depth of the taper is in the range of 0–5 microns.

19. A vertically tapered waveguide made according to the method of claim 12.

20. An optical device comprising:
a waveguide comprising an upper surface and a lower surface, the upper surface comprising a taper surface that provides a vertical taper to the waveguide, wherein the vertical taper is effective for coupling between waveguides having different mode sizes at opposite ends of the waveguide; and
a diffraction grating disposed on the taper surface, wherein the waveguide and the diffraction grating are made from a monolithic optical material, and wherein the monolithic optical material is over a substrate common to both the waveguide and the diffraction grating, the substrate disposed adjacent to the lower surface of the waveguide.

* * * * *